Figure 1:
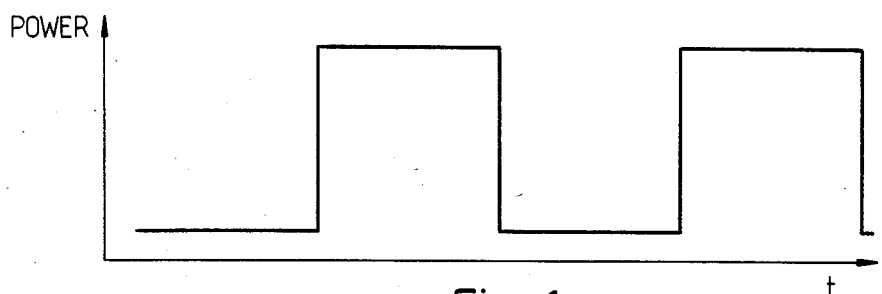

United States Patent [19]

Epworth

[11] Patent Number: 4,561,119
[45] Date of Patent: Dec. 24, 1985

[54] OPTICAL FREQUENCY MODULATION SYSTEM

[75] Inventor: Richard E. Epworth, Bishop's Stortford, England

[73] Assignee: International Standard Electric Corporation, New York, N.Y.

[21] Appl. No.: 410,690

[22] Filed: Aug. 23, 1982

[30] Foreign Application Priority Data

Sep. 3, 1981 [GB] United Kingdom ............... 8126694

[51] Int. Cl.⁴ .............................................. H04B 9/00
[52] U.S. Cl. .................................. 455/609; 332/7.51; 372/26; 455/617; 455/618
[58] Field of Search ............... 455/609, 611, 613, 615, 455/616, 618, 610, 612, 617; 372/26, 27, 28, 38, 44; 332/7.51

[56] References Cited

U.S. PATENT DOCUMENTS 3,324,295 6/1967 Harris ................................ 332/7.51
3,764,936 10/1973 Baugs ................................... 372/26
4,357,713 11/1982 Blackburn et al. ................. 455/609

Primary Examiner—Joseph A. Orsino, Jr.
Attorney, Agent, or Firm—John T. O'Halloran; Peter R. Ruzek

[57] ABSTRACT

An optical communication system including at a transmitter a semiconductor laser (2) and at a receiver a photodetector (3). Intermediate the transmitter and the receiver is an optical frequency discrimination (4), e.g. a Fabry-Perot resonator. The laser (2) is operated at a substantially constant average power level above the lasing threshold. Superimposed (5) on the substantially constant bias current is a low level modulation signal. The level of modulation of the bias current is sufficient only to cause an effective change in the optical frequency of the laser output without causing the laser oscillations to change from one longitudinal mode to another. The discriminator (4) is tuned to one of the frequencies thus produced.

12 Claims, 10 Drawing Figures

OPTICAL FREQUENCY MODULATION SYSTEM

This invention relates to an optical communication system of the type in which a modulating signal modulates a semiconductor injection laser at a transmitter and the laser output is detected at a receiver by a photodetector. Conveniently the transmitter and the receiver may be linked by a fibre optic transmission path.

Present optical transmission systems use intensity modulation of the source. This may be combined with various kinds of modulation of the electrical input e.g. PCM, PPM, FM, AM etc. but the information is impressed on the optical signal by intensity modulation. Some theoretical work has been done on true optical FM systems but it has been difficult to frequency modulate lasers. For an optical frequency modulation system to be practical the light to be modulated must be coherent.

According to the present invention there is provided an optical communication system including at a transmitter a semiconductor injection laser, at a receiver a photodetector, and intermediate the transmitter and the receiver optical frequency discrimination means, the transmitter also including a source of bias current for the laser, whereby the laser is operated at a substantially constant power level above the lasing threshold, and bias current modulation means arranged to modulate the bias current within predetermined limits, said limits being determined such that the depth of intensity modulation at the output of the frequency discrimination means is greater than the depth of frequency modulation at the input to the frequency discrimination means.

We have found that when an injection laser is directly modulated (by modulating the bias current) not only does the intensity change but so too does the wavelength. The deviation is only a few parts per million but it amounts to several Gigahertz as the optical frequency is so high. Although the deviation is greater at low frequencies as a result of thermal effects, at high frequencies the deviation per mA is flat to more than 500 MHz.

When a "single mode" injection laser is modulated from the lasing threshold to the peak optical power level the laser oscillation changes from one longitudinal mode to another and another. During the transitions the laser will oscillate in two longitudinal modes simultaneously despite the fact that when the same laser is biassed to a constant power level, it may oscillate only in a single longitudinal mode.

Therefore, if the bias current of a semiconductor laser is modulated with only a small modulating current, such that the depth of intensity modulation is quite small, a corresponding change of wavelength occurs which, when applied to an optical frequency discriminator, can be converted into intensity modulation. The optical frequency discriminator can be located at either the transmitter or the receiver. In the latter case, therefore, transmission between the transmitter and the receiver is achieved by optical frequency modulated signals.

Figure 2:
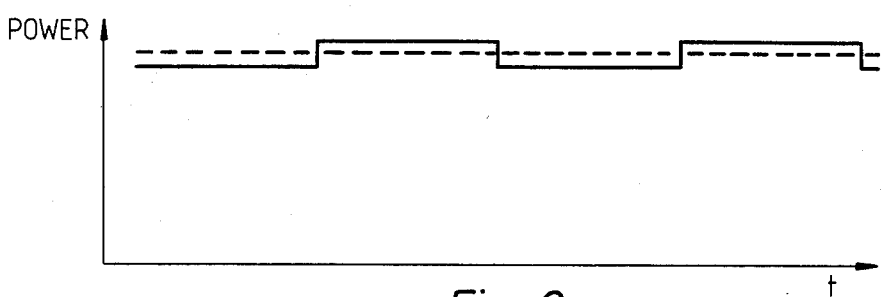
Figure 3:
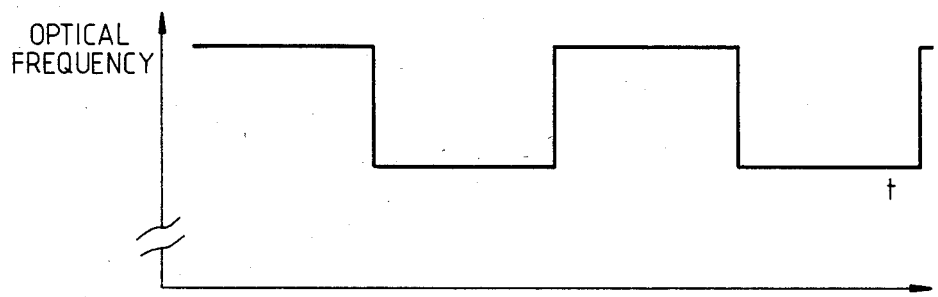
Figure 4:
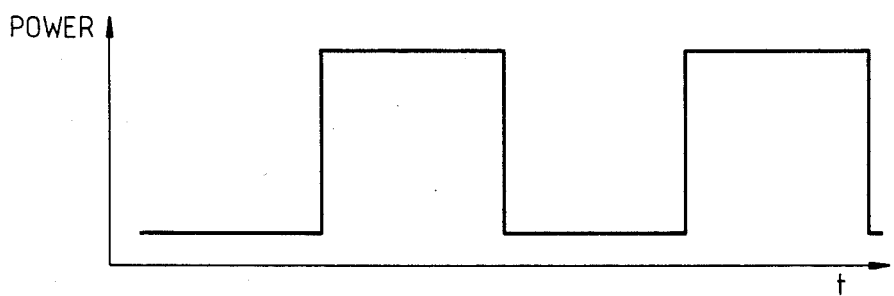
Figure 5:
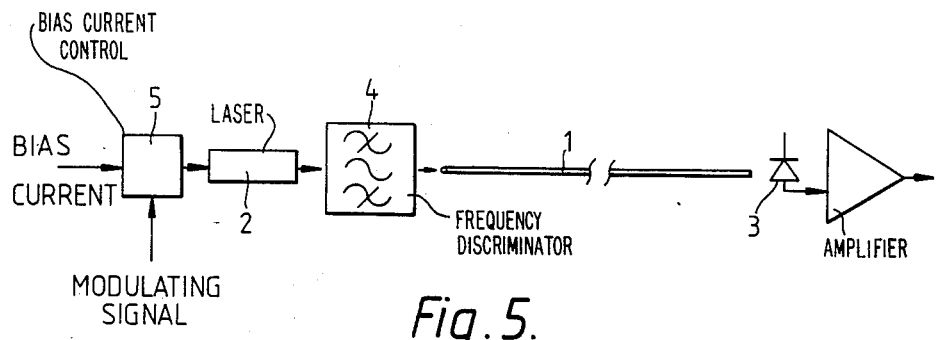
Figure 6:
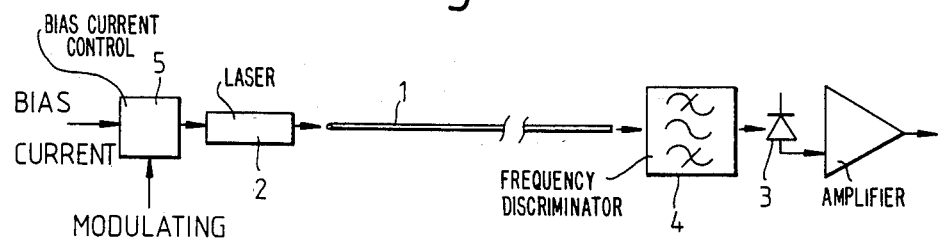
Figure 7:
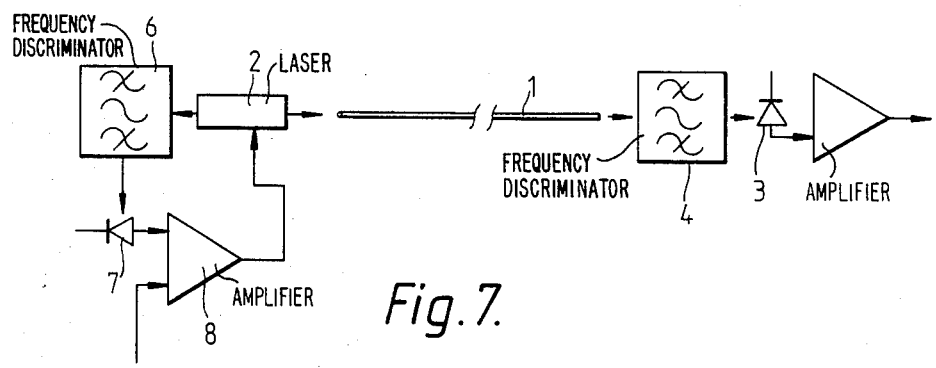
Figure 8:
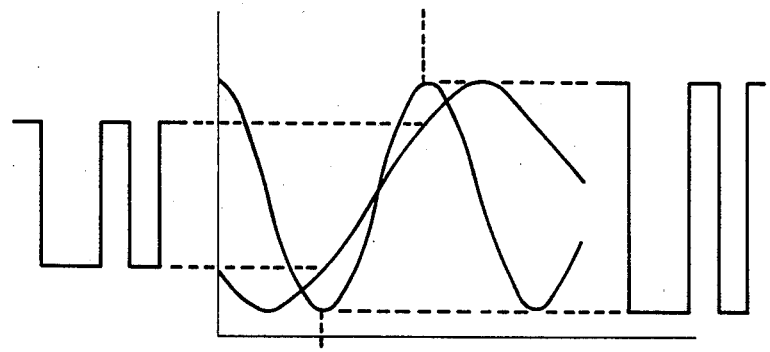
Figure 9:
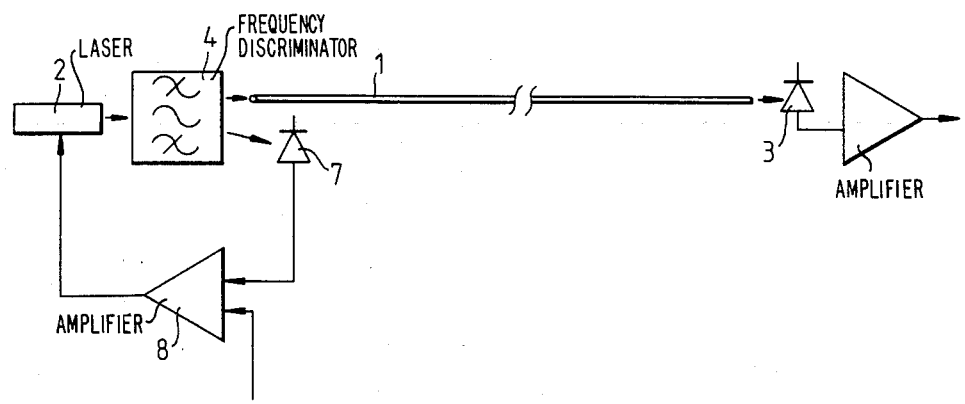
Figure 10:
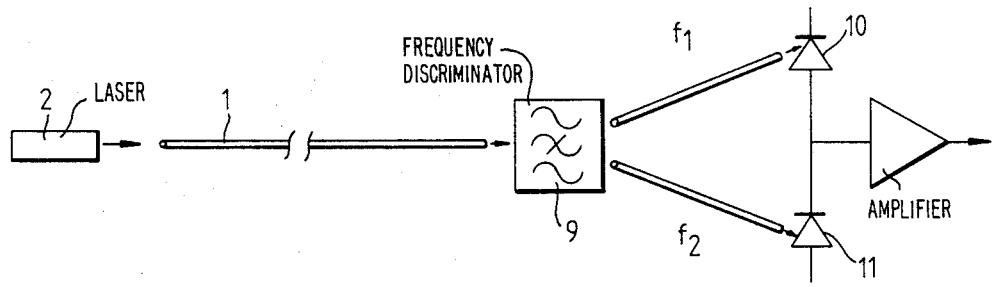

Embodiments of the invention will now be described with reference to the accompanying drawings, in which:

FIG. 1 illustrates conventional intensity modulation of a semiconductor injection laser, FIG. 2 illustrates the reduced level of intesity modulation required to achieve frequency modulation of the laser output according to the present invention, FIG. 3 illustrates the frequency modulation resulting from the reduced level of intensity modulation shown in FIG. 2, FIG. 4 illustrates the resultant intensity modulation when the frequency modulated optical signal shown in FIG. 3 is passed through an optical frequency discriminator, FIG. 5 illustrates a system having a frequency discriminator located adjacent the laser, FIG. 6 illustrates a system having a frequency discriminator located adjacent the photodetector, FIG. 7 illustrates frequency modulation of a laser utilising optical frequency feedback, FIG. 8 illustrates the effect of using a lower gain frequency discriminator in the feedback path of the arrangement shown in FIG. 7, FIG. 9 illustrates another method of controlling the frequency modulation of a laser using frequency feedback, and FIG. 10 illustrates a receiver arrangement for use with frequency modulated optical signals.

Conventional intensity modulation of a semiconductor injection laser is achieved by modulating the bias current from just below the lasing threshold, i.e. the "off" or "0" condition, to the peak power level from the "on" or "1" condition, as shown in FIG. 1.

For frequency modulation of an injection laser in accordance with the present invention the laser is initially current biassed to a high power level, as shown by the dotted line in FIG. 2. A small modulating of the bias current is now effected such that the average power output remains high at all times. This leads to a small but significant change in the frequency of the laser output, as shown in FIG. 3. This frequency modulated output can then be applied to a discriminator, e.g. a Michelson interferometer, a Mach Zehnder interferometer or a Fabry-Perot resonant cavity which is tuned to allow light at only one wavelength to pass through. The output of the discriminator then is effectively intensity modulated, as shown in FIG. 4. At wavelength $\lambda_1$, (frequency $f_1$) virtually full optical power is emitted from the discriminator, whilst at wavelength $\lambda_2$ (frequency $f_2$) little or no significant light is emitted.

The depth of modulation of the laser bias current is determined by the levels at which the laser oscillations change from one longitudinal mode to another. Obviously the greater the bias current modulation within this constraint the more effective the frequency modulation of the laser output will be and also the intensity modulation of the discriminator output.

This form of frequency modulation of an injection laser can be utilised in several ways. Typically, in a system using an optical fibre 1 (FIG. 5) to couple a laser 2 with a photodetector 3, the frequency discriminator 4 can be placed adjacent the laser 2. The resultant transmission in the optical fibre 1 is then intensity modulated, as explained above by controlling in a modulator 5 the level of the bias current. Alternatively the discriminator 4 can be placed adjacent the photodetector 3, as shown in FIG. 6. In this case the transmission in the optical fibre is frequency modulated. In each case the photodetector, e.g. a photo-conductive diode, is able to respond to an intensity modulated input.

In FIG. 7 there is shown a method of achieving the required level of modulation of the bias current for the laser. In a typical injection laser it is possible to obtain an optical output both from the so-called "front" of the laser 2, i.e. the emission into the optical fibre 1, and also from the "back" of the laser. In the arrangement of FIG. 7 a second frequency discriminator 6 is placed behind the laser 2 to receive light from the back of the laser. Alternatively the light for the second discriminator may be tapped from the light emitted by the front facet of the laser. The output of the second discriminator is fed to a second photodetector 7 which provides one input for a differential amplifier 8. The modulation signal is applied to the other input of amplifier 8 the output of which supplies the bias current for the laser in a negative feedback loop. The second discriminator monitors the instantaneous optical frequency with a required frequency and by electrical negative feedback adjusts the modulating current accordingly. This has the advantage of correcting variations in deviation with frequency, i.e. flattening the FM frequency response. Secondly it will make it possible to linearise the modulation. More precisely, it will linearise the modulation for a linear frequency discriminator or otherwise force the non-linearity to follow that of the discriminator. This can be used to advantage where a convenient FM discriminator has, for example, a sinusoidal rather than a linear response. Thus, provided the second or feedback discriminator is of the same type as the forward discriminator, the overall transfer function of the system will be linear.

The simplest implementation of optical FM discriminator is sensitive to changes in input power as well as frequency. As stated earlier, the laser output intensity is modulated to a small extent whilst frequency modulation is effected. This AM component may be compensated for, but not removed, by the use of a similar AM sensitive FM discriminator for the feedback loop. Alternatively, if the receiver uses an FM discriminator which is insensitive to variation in intensity then a similar one should be used for the feedback if good linearity is to be achieved.

For digital applications where non-linearity is less important than modulation depth it is possible to use for the feedback, a discriminator which has a lower gain (FIG. 8). This would enable stable operation of the feedback loop to be achieved despite the fact that the output from the receiver discriminator would enter regions of zero slope at the peak excursions.

The configuration shown in FIG. 5 may be improved by the application of feedback from the optical output of the discriminator back to the electrical input as shown in FIG. 9. This is similar to FIG. 7, but does not require the use of a second optical FM discriminator.

The advantage of using the FM discriminator to generate intensity modulation for transmission is that much smaller modulation currents may be used. This may make operation in single longitudinal mode possible even with high modulation depth. This is not possible with present day injection lasers.

However, utilising the frequency modulated output in the transmission does have one advantage in that a form of push-pull operation can be employed in the receiver, as shown in FIG. 10. In this case a double frequency discriminator is required at the receiver, one which will produce separate outputs at each of the two optical frequencies. It will be realised that if the whole of the frequency modulated output is transmitted from the laser then for both frequencies substantially full power is available at the receiver. Therefore the receiver is arranged so that at frequency $f_1$, the received light is directed to one photodetector 10 whilst at frequency $f_2$ the light is directed to a second photodetector 11. The two photodetectors are arranged in series with an output from the connection between them to an output amplifier. This arrangement has the added advantage that the receiver has a built in redundancy in case one of the photodetectors fails.

Whilst no detailed description has been given of the particular individual components and the precise methods of interconnecting them, e.g. the construction of an optical frequency discriminator or the coupling of light from a laser into an optical fibre, these are well known to those skilled in the art and do not form part of the present invention.

I claim:

1. An optical communication system including at a transmitter a semiconductor injection laser, at a receiver a photodetector, and intermediate the transmitter and the receiver optical frequency discrimination means, the transmitter also including a source of bias current for the laser, whereby the laser is operated at a substantially constant average power level above the lasing threshold, and bias current modulation means arranged to modulate the bias current within predetermined limits, said limits being determined such that the depth of intensity modulation at the output of the frequency discrimination means is greater than the depth of intensity modulation at the input to the frequency discrimination means wherein an optical output is obtained from the front of the laser, supplying optical power for the receiver, the system further including means for deriving a second optical output from the laser, a second optical frequency discrimination means to which said second output is fed, the output of the second discrimination means being fed to a second photodetector which supplies one input to a differential amplifier the other input of which is fed with a modulation signal, the output of the differential amplifier being the modulated bias current for the laser.

2. A system according to claim 1 wherein the second discrimination means has substantially the same characteristics as the first discrimination means.

3. A system according to claim 1 wherein the second discrimination means has a lower gain than the first discrimination means.

4. A system according to claim 1 wherein transmission between the transmitter and the receiver is by way of an optical fibre.

5. An optical communication system including at a transmitter a semiconductor injection laser, at a receiver a photodetector, and intermediate the transmitter and the receiver, and adjacent the laser, optical frequency discrimination means, the transmitter also including a source of bias current for the laser, whereby the laser is operated at a substantially constant average power level above the lasing threshold, and bias current modulation means arranged to modulate the bias current within predetermined limits, said limits being determined such that the depth of intensity modulation at the output of the frequency discrimination means is greater than the depth of intensity modulation at the input to the frequency discrimination means, wherein a portion of the output of the discrimination means is fed to a second photodetector at the transmitter which includes a feedback loop comprising a differential amplifier to one input of which the output of the second photodetector is applied and to the other input of which a modulating signal is applied, the amplifier output providing the modulated bias current for the laser.

6. A system according to any one of claims 1, 2, 3, or 5 wherein the or each optical frequency discrimination means comprises a Fabry-Perot resonant cavity.

7. A system according to any one of claims 1, 2, 3, or 5 wherein the or each optical frequency discrimination means comprises a Michelson interferometer.

8. A system according to any one of claims 1, 2, 3, or 5 wherein the or each optical frequency discrimination means comprises a Mach-Zehnder interferometer.

9. An optical communication system including at a transmitter a semiconductor injection laser, at a receiver a photodetector, and intermediate the transmitter and the receiver optical frequency discrimination means, the transmitter also including a source of bias current for the laser, whereby the laser is operated at a substantially constant average power level above the lasing threshold, and bias current modulation means arranged to modulate the bias current within predetermined limits, said limits being determined such that the depth of intensity modulation at the output of the frequency discrimination means is greater than the depth of intensity modulation at the input to the frequency discrimination means wherein the frequency discrimination means is adjacent the receiver which includes first and second photodetectors connected in series, the junction between the photodetectors being connected to the receiver, the frequency discrimination means being such as to produce separate optical outputs at each of two different optical frequencies, and separate means for coupling the two optical outputs to respective ones of the two photodetectors.

10. A system according to claim 9 wherein the optical frequency discrimination means comprises two separate Fabry-Perot resonators tuned to different optical frequencies.

11. A system according to claim 9 wherein the optical frequency discrimination means comprises two separate Michelson interferometers tuned to different optical frequencies.

12. A system according to claim 9 wherein the optical frequency discrimination means comprises two separate Mach-Zehnder interferometers tuned to different optical frequencies.

* * * * *